Oct. 25, 1932.   R. L. BACHER   1,884,507
POWER PUMP
Filed June 2, 1927   2 Sheets-Sheet 2

Inventor
Rollin L. Bacher

By Bates, Macklin, Gobrick & Teare
Attorneys

Patented Oct. 25, 1932

1,884,507

UNITED STATES PATENT OFFICE

ROLLIN L. BACHER, OF LAKEWOOD, OHIO, ASSIGNOR TO THE U. S. AIR COMPRESSOR COMPANY, OF CLEVELAND, OHIO, A CORPORATION OF OHIO

POWER PUMP

Application filed June 2, 1927. Serial No. 195,994.

This invention relates to power grease pumps, particularly those which are adapted for use at service stations to permit the lubrication of motor vehicles. One of the difficulties heretofore experienced in the lubrication of motor vehicles has been that of obtaining a portable pump, which is capable of delivering sufficient pressure to break the accumulated grease seal particularly on spring shackle bolts.

An object of the present invention is to make a power grease pump which is compact in construction and yet which will develop very great pressure and therefore will permit the lubrication of vehicles at service stations in an expeditious manner. A further object is to make a power grease pump which may be operated by an electric motor and may be readily moved from one place to another and operated from the ordinary electrical service line.

Figure 1:
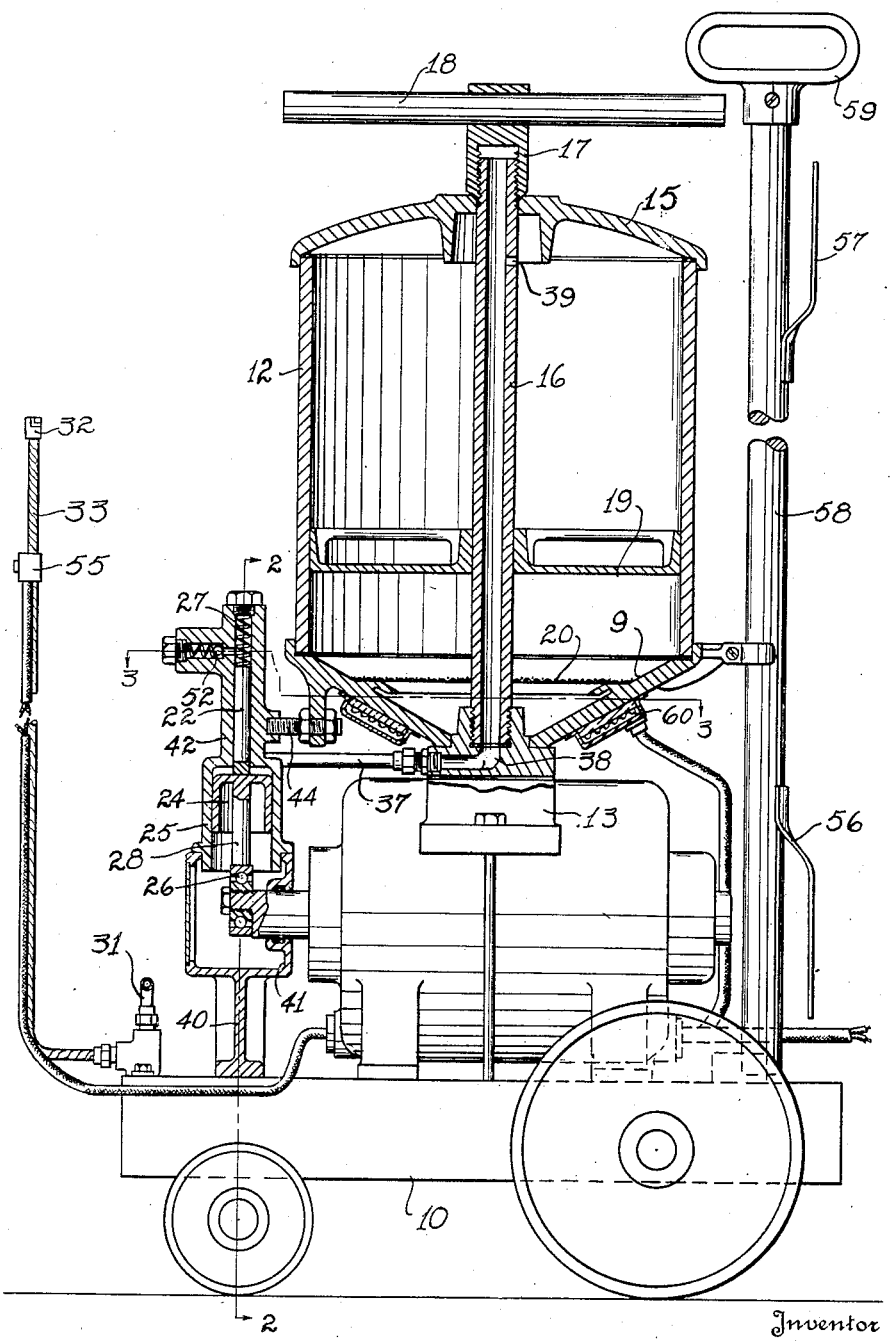
Figure 2:
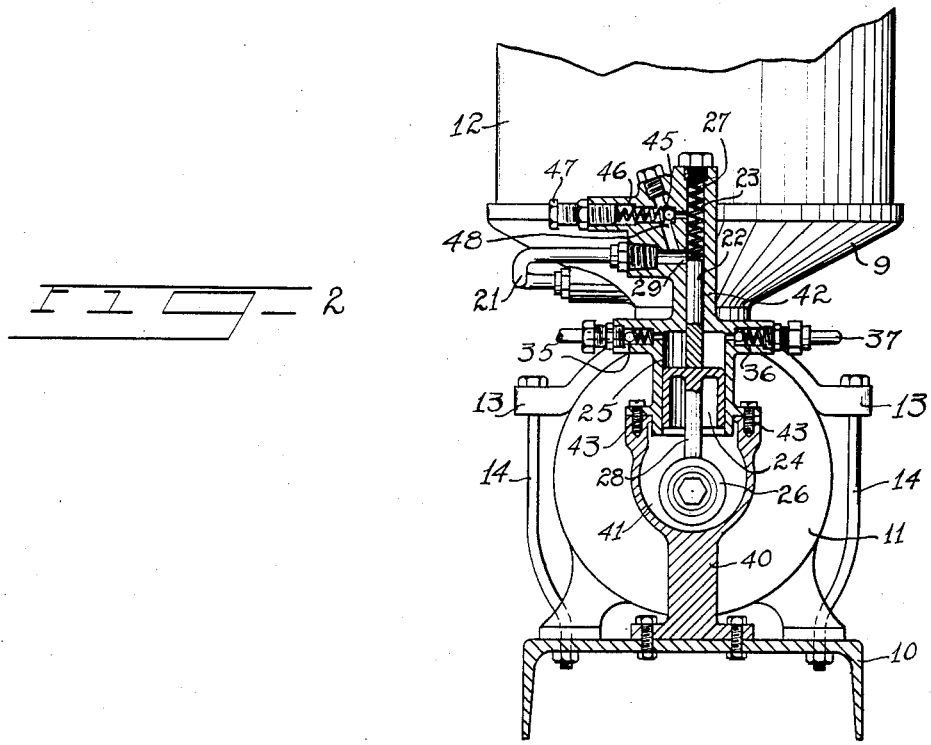
Figure 3:
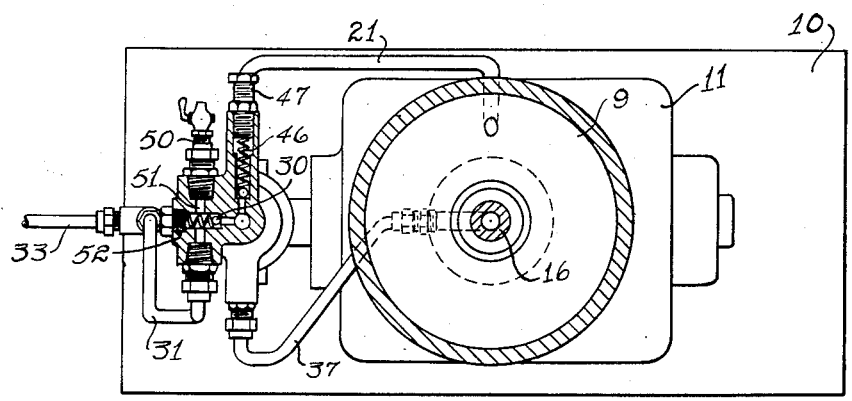

The preferred means for carrying out my invention is illustrated in the drawings wherein Fig. 1 is a vertical longitudinal section through a machine embodying my invention; while Figs. 2 and 3 are sections taken on planes indicated by the correspondingly numbered lines in Fig. 1.

The pump embodying my invention comprises in general a grease reservoir with an air compressor which is adapted to place a head of air above the grease so as to force it into a pressure boosting device from whence it flows through a coupler to the fitting. The device is also capable of being used in dispensing any semi-hard plastic substances, but I have illustrated it only in connection with a coupler which is adapted to be attached to a lubricant fitting.

In the drawings, 10 represents a wheeled carriage on which an electric motor 11 is supported in any suitable way. The carriage also supports a reservoir 12. In the preferred form such reservoir has a plurality of parts, one of which comprises a saddle 13 which is fastened to the carriage as by bolts 14. A member 9 rests upon the saddle and forms a bottom for the reservoir, while a lid 15 is disposed at the top and is removable to permit the insertion of the desired material. A hollow bolt 16 is shown as being in threaded engagement with a central opening in the saddle and as projecting beyond the lid. Such projecting portion is threaded and is adapted to receive a nut 17 which functions to clamp the various parts of the reservoir to the saddle. A cross bar 18 may extend through the nut and be used for enabling the reservoir parts to be clamped together in an expeditious manner. The various interfitting joints of the reservoir and also the connection between the nut and the lid are made air tight.

Within the reservoir, a follower plate 19 rests upon the top of the lubricant and acts as a piston to force the material into the booster pump. A strainer 20 is preferably used within the reservoir and above the discharge passageway 21 which leads from the bottom of the reservoir beneath the strainer.

The material flowing from the reservoir is led into a booster pump and then is forced into the discharge conduit. In the preferred construction such booster pump comprises a plunger 22, which operates within a cylinder 23 under the action of a reciprocating piston 24. Such piston operates within the cylinder 25 and is in turn operated by a roller bearing 26. The axis of such bearing member is eccentric to the axis of the armature shaft. A spring 27 acting on the top of the plunger 22 urges the plunger and piston downwardly and tends to hold the shank 28 of the piston in engagement with the eccentric bearing member. The bore and stroke of the plunger are comparatively small, and in the preferred arrangement the top of the plunger is about at the center of the lubricant inlet conduit 29, when the plunger is in the lowermost position. This opening is ordinarily sufficient to cause the flow of material into the plunger cylinder so long as there is a head of air within the reservoir. A lubricant discharge passageway 30 leads from the cylinder 23 and communicates with a discharge conduit 31 which leads to a coupler 32 at the end of a flexible conduit 33, when the pump is used for dispensing lubricant.

To maintain a head of air within the reservoir, I utilize the piston 24 and cylinder 25 as an air compressor. Such compressor has inlet and outlet valves indicated at 35 and 36 respectively, near the top of the cylinder. From the outlet valve, air under pressure flows through pipe 37, thence through passageway 38 in the saddle, and then into the hollow interior portion of the bolt 16. An opening 39 extends laterally through the wall of the bolt near the reservoir lid and permits the air to flow into the reservoir and above the follower plate. Thus a head of air is maintained at all times within the reservoir. Such head has sufficient pressure to insure a free flowing action of the lubricant material. Sufficient clearance is maintained between the top of the piston and the cylinder head to prevent the building up of excessive air pressure.

To assist in preventing the lubricant from becoming too hard, particularly in cold weather I may employ a heating device which is associated with the bottom of the reservoir. One form of such device as illustrated comprises an electric heating element 60 which is disposed in proximity to the outer surface of the reservoir bottom, and which is adapted to be energized from the same source of current, which is utilized for actuating the motor.

The cylinder mounting which I have shown provides a simple, compact construction, which can be made to withstand the desired pressure, and which can be readily assembled without the necessity for excessive machine work. To this end the cylinder mounting comprises a base 40 which is bolted to the carriage and which has a chamber 41 in which the eccentric operates. Surmounting the base is a cylinder block the lower end of which is formed to make the cylinder 25, and the upper end of which is formed to make the cylinder 23. The cylinder block is shown as being fastened to the base by securing members 43 and as being fastened to the reservoir bottom by a stud bolt 44. All of the air and lubricant openings are in the cylinder block, wherefore the entire construction is a relatively small compact unit.

To safeguard against the building up of excessive lubricant pressure, I have shown a by-pass valve 45 which leads from the cylinder 23 and is normally maintained closed by a spring 46. The tension on such spring may be set to permit opening of the valve at a predetermined pressure by adjustment of a set screw 47. A by-pass conduit 48 leads from the by-pass valve chamber into the inlet passageway 29. Thus, if the lubricant pressure in the discharge conduit 31 exceeds a predetermined amount, the by-pass valve will open and allow the lubricant to circulate back to the inlet passageway until the pressure conditions are again restored to normal.

Normally the coupler can be readily disengaged if the lubricant can find its way through the fitting and into the bearing; but if an obstruction should prevent the free passage of lubricant then an excessive pressure will build up within the discharge conduit, and will prevent the removal of the coupler from engagement with the fitting. I therefore provide a manually controlled release valve 50, which through the passageway 51, is in engagement with the discharge conduit. A check valve 52 normally prevents the flow of lubricant from the discharge passageway into the cylinder 23. Therefore, such check valve prevents the reduction of pressure when a pressure sealing form of coupler is attached to the fitting, and necessitates some form of pressure release valve.

A switch 55 for controlling the flow of current to the motor is shown as being mounted upon the discharge conduit near the coupler. To permit movement of the carriage within a limited radius from the point of electrical service connection, I have shown brackets 56 and 57 upon an arm 58 for holding a suitable length of cable. A handle 59 on the arm facilitates movement of the carriage from one place to another.

In practice, the motor is operated until the desired head of air is obtained within the reservoir. Then the coupler is attached to the fitting and is held thereagainst until the desired amount of lubricant has been expelled. The motor is then stopped and the coupler is removed and attached to another fitting. This procedure is carried on until all the desired places have been lubricated. In case a grease seal prevents the lubricant from flowing easily through the discharge conduit into the bearing, then to avoid the necessity for waiting until the pressure normally reaches zero, the operator opens the release valve 50. This quickly brings the pressure down to normal and allows the coupler to be disengaged and attached to another fitting. Thus the various parts of the vehicle may be quickly lubricated.

The important advantage of a grease pump made in accordance with my invention is the fact that enormous pressure may be built up in the discharge conduit, and that the construction permits the parts to be easily made to withstand the extraordinary pressures. Moreover, the entire device is a compact arrangement which can be readily moved from one place to another, and which is therefore adapted for use in garages and at service stations.

I claim:

1. In a lubricant dispensing apparatus, the combination with a lubricant storage container, of an electric motor having an armature shaft, an air pump operated by the motor for forcing air under pressure into the top of the container, a lubricant discharge conduit, a booster pump in the conduit, said booster pump and air pump including reciprocating pistons, an eccentric mounted on the armature shaft for operating one of the pistons directly from the motor, and means for operating the other piston directly from the first named piston.

2. In a lubricant dispensing apparatus, the combination with a lubricant storage container, of an electric motor, a casing having a pair of aligned cylinders therein, the casing being spaced from the end of the motor, the armature shaft of the motor projecting into the casing and having an eccentric associated therewith within the casing, a piston operating in each of said cylinders, means for causing simultaneous reciprocation of the pistons by the eccentric, one of said pistons comprising an air pump operating to force air under pressure into the top of the container, and the other comprising a booster pump operating to increase the pressure on the lubricant flowing from the container, and the booster pump having inlet and discharge valves on the same end of the cylinder.

3. In a lubricant dispensing apparatus, the combination with an electric motor, of a lubricant storage tank associated with the motor, a casing disposed adjacent the lower end of the tank and disposed adjacent the end of the motor, said motor having the armature shaft thereof projecting into the casing, an eccentric on the armature shaft, said casing having cylinders of different diameter in axial alignment and communicating with each other, and means within the casing for connecting one of the pistons with the eccentric, said piston functioning to force air under pressure into the top of the container, and the second named piston being operated directly by the first named piston and functioning to increase the pressure of lubricant flowing from the container.

4. In a dispensing apparatus, the combination with an electric motor, of a lubricant storage tank associated therewith, a discharge conduit leading from the tank, a casing disposed adjacent the lower end of the tank and having a pair of axially aligned cylinders therein, a piston operating in each cylinder, the armature shaft of said motor projecting into said casing, an eccentric operatively connecting the armature shaft to one of the pistons so as to effect reciprocation thereof in one of the cylinders, the second piston being reciprocated by contact with the first named piston, yieldable means for holding said pistons into operative engagement with said eccentric, one of said pistons operating to force air under pressure into the tank to place an initial pressure upon the lubricant therein, and the other of said pistons operating to increase the pressure of lubricant flowing through the discharge conduit.

In testimony whereof, I hereunto affix my signature.

ROLLIN L. BACHER.